[19] United States Patent
Matthews

[15] 3,694,952
[45] Oct. 3, 1972

[54] FISH GRAPPLING DEVICE
[72] Inventor: Edward E. Matthews, P.O. Box 1394, Galveston, Tex. 77550
[22] Filed: July 22, 1970
[21] Appl. No.: 57,183

[52] U.S. Cl. ..................................................43/5
[51] Int. Cl. ...........................................A01k 97/14
[58] Field of Search....43/5, 17.2, 42.7, 42.24, 43.16, 43/44.81, 44.82

[56] References Cited
UNITED STATES PATENTS
2,233,670   3/1941   Lee.................................43/5
2,210,271   8/1940   Thwaits..........................43/5
2,316,500   4/1943   Bray.............................43/17.2
2,739,404   3/1956   Koester, Sr...................43/17.2

Primary Examiner—Warner H. Camp
Attorney—Donald Gunn

[57] ABSTRACT

An elongated metal rod member is formed into an eyelet at one end and is provided with a gaff hook at its other end. An intermediate portion of the member is formed into spaced helical coils to slidably receive a fishing line.

10 Claims, 7 Drawing Figures

PATENTED OCT 3 1972     3,694,952
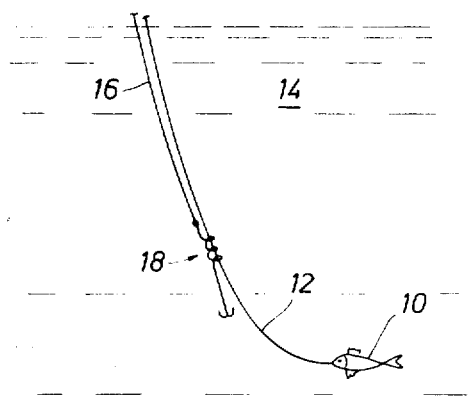
FIG. 1
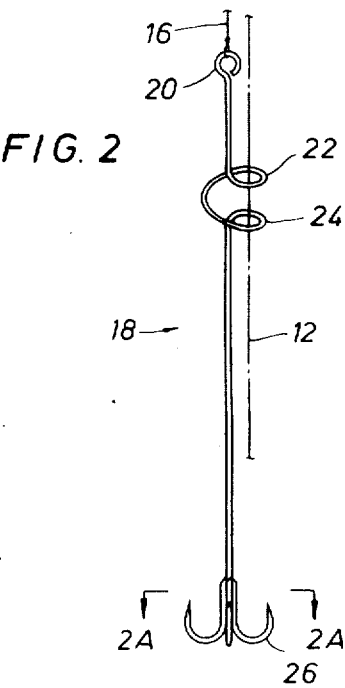
FIG. 2
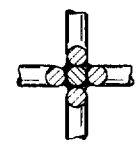
FIG. 2A
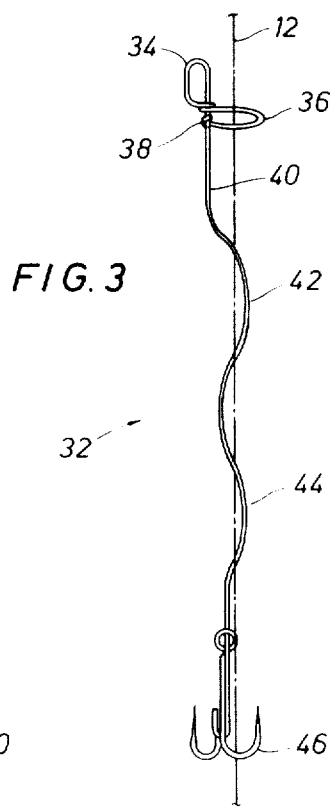
FIG. 3
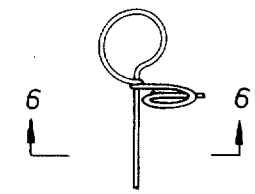
FIG. 5
FIG. 6
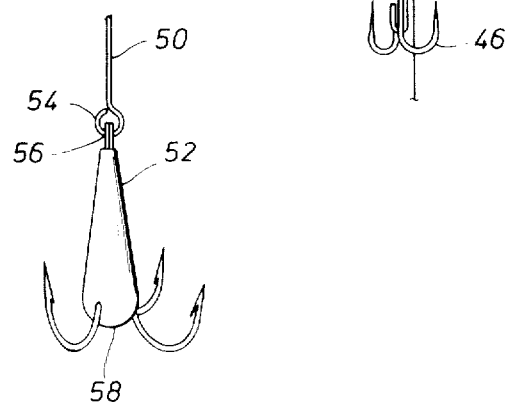
FIG. 4
Edward E. Matthews
INVENTOR
BY *Donald Lum*
ATTORNEY

FISH GRAPPLING DEVICE

RELATED APPLICATIONS

The present application relates to U.S. Pat. No. 3,375,601, entitled "Fishing Gaff," and U.S. Pat. No. 3,526,053 entitled "Fishing Gaff."

SUMMARY OF PROBLEM AND SOLUTION

Difficulties are quite often encountered in retrieving fish after they have been caught. As recounted in the previously issued U.S. Pat. 3,375,601, and U.S. Pat. No. 3,526,053 the problems of placing a gaff in a fish are at least substantially reduced through the use of a grappling device which is carried to the vicinity of the fish by allowing it to travel on the fishing line itself. The present apparatus is an improvement over, and different from the structure shown in the previously issued patents. The present invention may be described somewhat as a simplification over the structure of the two previous inventions of applicant. The simplification lies in the fact that it is not necessary to fabricate circular pieces of material, typically stainless steel. It is believed that the mode of simplification will be apparent from the drawings. Further, the device appears to be cheaper to manufacture and ship.

In any case, the present invention is summarized as being directed to a grappling device for retrieving a fish, which is adapted to be run along the fishing line after the fish is caught. The device is preferably attached to a hand line for ease of retrieval. The hand line is preferably sufficiently stout to lift the fish from the water. The hand line is connected to the grappling device, and the grappling device includes an eyelet or a means for slidably engaging the grappling device with the fishing line. For instance, there might be as much as fifty feet of line from the fishing tackle to the fish itself. In any case, the device is engaged through the use of an eyelet or some other suitable means to permit the grappling device to slide down the line in the water and to the vicinity of the fish. There, the fish is grabbed by hand manipulation of the line to thereby retrieve the fish upon setting a treble hook in the fish.

Many objects and advantages of the present invention will become more readily apparent from a consideration of the following specification and drawings, wherein:

FIG. 1 shows a fish which has been caught on a fish line and the present invention being carried on a hand line down the fish line to the vicinity of the fish;

FIG. 2 shows a first embodiment of the present invention and particularly illustrates the means for connecting the present invention slidably on the fish line;

FIG. 2A is a sectional view taken along line 2A—2A of FIG. 2;

FIG. 3 is a view similar to FIG. 2 showing an alternative embodiment;

FIG. 4 is an enlarged view of the treble hook showing even further alterations on the structure of the present invention;

FIG. 5 is an enlarged view of an alternative fishing line eyelet; and

FIG. 6 is a sectional view taken along the line 6—6 of FIG. 5 illustrating the eyelet of FIG. 5 in greater detail.

In the drawings, attention is first directed to FIG. 1 where a fish 10 is shown caught on a fishing line 12 in a body of water indicated by the numeral 14. The numeral 16 identifies a particular hand line to be contrasted with the line 12 which extends typically to conventional fishing tackle or gear. The hand held line 16 extends from the fisherman typically on a boat or pier to the invention which is indicated by the numeral 18. The grappling device 18 is thus shown in the context of its application for the purpose of retrieving the caught fish after it is brought close to the pier or boat where the fisherman is located.

Considering the details of the present invention more closely, attention is directed to FIG. 2 of the drawings. In FIG. 2, the fishing line 12 is indicated in a taut condition. The present invention, indicated by the numeral 18, is shown connected to its hand line 16 which extends back to the fisherman on the boat or pier. The line 16 is connected through a small connector eyelet 20 which is formed at the upper end of the grappling device 18. In the embodiment of FIG. 2, the grappling device is formed essentially of a single piece of metal of substantial length. The metal is formed to create the connective eyelet 20 for the retrieval line 16. In addition, the upper end of the device is looped into a pair of loops identified at 22 and 24 to thereby permit the grappling device to be engaged with the fishing line 12. In further particular, the loops 22 and 24 encircle the line 12 to guide the grappling device 18 to the vicinity of the fish in the water 14. It should be noted that the single member which comprises the length of the grappling device 18 is wound somewhat tightly in comparison with the embodiment of FIG. 3 to be described. More particularly, the loops 22 and 24 are somewhat close to one another in comparison with the full length of the device. They may be perhaps one or two inches apart for the embodiment of FIG. 2. Moreover, for ease of fabrication and construction, the loops need not be quite the same in size, and the continuation of the single member which comprises the shank of the hook or grappling device 18 may be fabricated with tolerances which are somewhat loose to thereby permit a device of relatively modest cost to be fabricated in accordance with the teachings of the present invention.

The single member which comprises the major portions of the embodiment 18 has a substantial portion of its length, perhaps 80 percent, below the ring-like encircling member 22 and 24. It extends the full length of the grappling device 18 which terminates in a treble hook 26. In the embodiment shown, the shank or body portion is separate and the treble hook 26 is connected to it through a series of welds where it is brazed or welded to the elongate body. This mode of multiple piece construction is readily suitable for manufacture of the present invention. Since it is a manufacturing convenience, it will be understood and appreciated that the multiple piece construction wherein the treble hook 26 is a separate piece which is joined to the body or shank portion of the grappling device 18 is not a limitation on the practice of the invention. Also, the hook 26 may have two, four, or more points.

Attention is next directed to FIG. 3 of the drawings where the fishing line 12 is shown engaged in a different embodiment which is indicated generally by the number 32. The embodiment 32 is similar to the embodiment 18 in its operation and function. However, several differences arise in the structure of the device. In the first instance, an eyelet 34 is provided for connection with the hand line 16. Moreover, a snap ring at 36 is used to first engage the grappling device 32 with the line 12. The snap ring 36 includes a latch or clasp at 38 which can be easily formed through the expediency of merely bending the tip of the rod-like material in a semi-circle to engage the latch ring 36 with the body 40 of the device. Additionally, two loops are indicated at 42 and 44 in the body 40. However, the loops 42 and 44 differ from the loops 22 and 24 in FIG. 2 in that their pitch or length along the grappling device 32 is quite large and the spacing is consequently quite large. The loops 22 and 24 in FIG. 2 are perhaps one or two inches apart. In FIG. 3, they are at least six to twelve inches apart. The pair of loops are gradually formed in the member as opposed to being sharply bent to define the member of FIG. 2. The pitch of one loop is about six inches compared to about one inch in FIG. 2. In any case, the loops 42 and 44 still readily engage the fishing line 12 in the same manner as that of the structure of FIG. 2, except that the treble hook 46 carried at the lower end is kept closer to the line 12. The treble hook 46 is similar to the hook 26 shown in FIG. 2 but it is attached in a different manner. The hook 26 is a bought item having an eyelet which is placed around the shank of the body. Again, multiple piece construction is used as a matter of manufacturing convenience.

Attention is directed to FIG. 4 of the drawings which illustrates the lower end of a grappling device which is identified by the numeral 50 and a weighted treble hook 52. In the embodiment of FIG. 4, an eyelet 54 is engaged with a similar eyelet 56 for the purpose of pivotally connecting the treble hook to the grappling device proper. The treble hook includes the standard three hooks in a weighted body which is indicated at 58. The pivotal connection permits the treble hook to hang downwardly from its own weight when the device is permitted to run along the fishing line 12 to the near vicinity of the fish.

FIG. 5 discloses an alternative form of fishing line eyelet, distinguished by the advantage that the line is threaded without snapping or unsnapping any apparatus. Thus, one hand can hold the grapple device and the other may hold the fishing tackle such that the fishing line is easily located in front of the fisherman.

It will be understood and appreciated that the apparatus of the present invention can be built in several sizes. For instance, the device might range from one foot in length for a small grappling device to about three feet in length for a grappling device capable of handling fish weighing 50 to 100 pounds. For larger fish yet, the grappling device must be even larger. As the device becomes larger, the gauge of metal or wire used in forming the device increases.

Many alterations and variations in the present invention may be incorporated without departing from the spirit of the invention. By way of example, the connective eyelet which joins the grappling device to the line may vary. In the version of FIGS. 2 and 3, two loops are included. Three or more loops may be utilized, although it is difficult to thread the device on the fishing line when the number of loops is excessive. The optimum numbers are preferably two to four loops in the device. The diameter of the loops is preferably enough to ride over fishing apparatus in the line 12 to its hook.

The manner of connecting the grappling device temporarily to the fishing line after the fish has been caught is also a source of variation. For instance, the latched eyelet 36 of FIG. 3 may be utilized. Other latching apparatus is likewise readily available. However, in the absence of a latch, it is still relatively easy to thread the device onto the fishing line by simply rotating it about the fishing line in the manner such that the line passes through the bights of the loops to the posture of FIGS. 2 and 3.

The details of construction of the lower end are likewise subject to variation. A pivotal connection to the treble hook in the manner of FIG. 4 may be incorporated, or single piece fabrication may be utilized. The structures shown in FIGS. 2 and 3 utilize welded or brazed manufacturing techniques, but this is also subject to variation.

While the foregoing has been directed to the preferred embodiments of the present invention, the scope of the present invention is determined by the claims appended hereto.

What is claimed is:

1. A fishing gaff which comprises an elongate body having a connective means near its upper end and adapted to be connected with a line which is held by a fisherman; said elongate body comprising a substantial portion of the length of said fishing gaff; loop means at at least a pair of spaced locations along said body and being formed with said body in a manner such that said body is elongate, formed of a generally continuous member with said loop means having the form of helixes for a portion of their curvature along said body and having an open throat for a portion of the length thereof to receive a fishing line therein which extends from a fisherman above the water to a fish which has been caught, such fishing line being of sufficient length to carry the fishing gaff by gravity movement from the vicinity of the fisherman above the water to the vicinity of the fish below the water; and hook means carried near the lower end of said body for gaffing or grappling the fish when the fishing gaff is in the vicinity of the fish.

2. The invention of claim 1 wherein said hook means includes a treble hook.

3. The invention of claim 1 wherein said hook means includes:
   a. a treble hook;
   b. a pivotal connection joining said treble hook to said elongate member; and,
   c. a weight carried on said treble hook.

4. The invention of claim 1 including a snap ring eyelet carried on the upper end of said body having an open and closed position, said open position permitting said eyelet to be engaged around the fishing line and said closed position securing the fishing grapple device to the fishing line.

5. The invention of claim 1 including a pair of loops formed of the material comprising the elongate body and being of integral construction therewith for engaging the fishing line extending from the fisherman above the water to the fish in the water.

6. The invention of claim 5 wherein said integral loops are spaced approximately 1 to 2 inches apart and are located nearer the upper end rather than the lower end thereof.

7. The invention of claim 5 wherein said loops are at widely spaced locations along the length of said elongate member and are adapted to be engaged with the fishing line extending from the fisherman above the water to the fish in the water.

8. The invention of claim 5 wherein said loops are of substantially great pitch, and at least one is located above the mid point of said elongate member, and at least one is located below the midpoint of said elongate member.

9. The invention of claim 1 including an elongate member formed into said elongate body and incorporating a pair of integrally formed loops in the elongate member having a pitch of about one inch and a spacing of about one to two inches, and sufficient diameter to slide down the fishing line.

10. The structure of claim 1 wherein said body, at its central portions, is comprised of a single bent wire-like member.

* * * * *